(12) United States Patent
Wu et al.

(10) Patent No.: US 8,806,868 B2
(45) Date of Patent: Aug. 19, 2014

(54) SECONDARY AIR INJECTION SYSTEM AND METHOD

(75) Inventors: Ko-Jen Wu, Troy, MI (US); Darrell J. Walter, Romeo, MI (US)

(73) Assignee: GM Global Technology Operations LLC, Detroit, MI (US)

(*) Notice: Subject to any disclaimer, the term of this patent is extended or adjusted under 35 U.S.C. 154(b) by 185 days.

(21) Appl. No.: 13/029,818

(22) Filed: Feb. 17, 2011

(65) Prior Publication Data

US 2012/0210712 A1  Aug. 23, 2012

(51) Int. Cl.
*F02B 33/44* (2006.01)
*F01N 5/04* (2006.01)
*F01N 3/00* (2006.01)
*F01N 3/30* (2006.01)
*F02B 37/18* (2006.01)
*F02M 25/07* (2006.01)

(52) U.S. Cl.
CPC .............. *F02B 37/18* (2013.01); *Y02T 10/121* (2013.01); *F01N 3/30* (2013.01); *Y02T 10/146* (2013.01); *F02M 25/0707* (2013.01); *Y02T 10/20* (2013.01); *Y02T 10/144* (2013.01)
USPC ................. 60/605.1; 60/611; 60/280; 60/289

(58) Field of Classification Search
CPC ............. F02B 37/00; F01N 3/30; F01N 3/22; F01N 3/222; F01N 3/225; F01N 3/227; F01N 3/00; F01N 13/00; F01N 13/02; Y02T 10/121; Y02T 10/144; Y02T 10/20; F02D 17/02
USPC .................. 60/280, 289, 284, 287; 123/198 F
See application file for complete search history.

(56) References Cited

U.S. PATENT DOCUMENTS

| 3,335,564 A | 8/1967 | Hines |
| 3,906,722 A | 9/1975 | Garcea |

(Continued)

FOREIGN PATENT DOCUMENTS

| DE | 7529221 U | 11/1977 |
| DE | 19832627 A | 1/2000 |

(Continued)

OTHER PUBLICATIONS

Aachener Kolloquium Fahrzeug—und Motorentechnik 2009; New Aspects of Application of Hybrid EGR Systems to Turbocharged GDI Engines; David Roth, Rong Zhang, Rolf Sauerstein, Michael Becker, BorgWarner Engine Systems Group, pp. 1-24.

(Continued)

*Primary Examiner* — Thai Ba Trieu
*Assistant Examiner* — Ngoc T Nguyen

(57) ABSTRACT

According to one embodiment of the invention, a secondary air injection system includes a first conduit in fluid communication with at least one first exhaust passage of the internal combustion engine and a second conduit in fluid communication with at least one second exhaust passage of the internal combustion engine, wherein the at least one first and second exhaust passages are in fluid communication with a turbocharger. The system also includes an air supply in fluid communication with the first and second conduits and a flow control device that controls fluid communication between the air supply and the first conduit and the second conduit and thereby controls fluid communication to the first and second exhaust passages of the internal combustion engine.

10 Claims, 3 Drawing Sheets

(56) References Cited

U.S. PATENT DOCUMENTS

| | | | |
|---|---|---|---|
| 4,056,933 A | 11/1977 | Nohira et al. | |
| 4,133,175 A | 1/1979 | Katoh | |
| 4,149,378 A | 4/1979 | Nakamura et al. | |
| 4,373,336 A | 2/1983 | Horler et al. | |
| 4,674,283 A | 6/1987 | Ishida et al. | |
| 4,813,232 A * | 3/1989 | Hitomi et al. | 60/313 |
| 5,392,601 A | 2/1995 | LeVine | |
| 5,471,835 A | 12/1995 | Friedman | |
| 5,765,368 A * | 6/1998 | Matsumoto et al. | 60/274 |
| 5,878,567 A * | 3/1999 | Adamczyk et al. | 60/274 |
| 6,094,909 A | 8/2000 | Weber et al. | |
| 6,167,754 B1 * | 1/2001 | Koenders | 73/114.73 |
| 6,334,436 B1 | 1/2002 | Paffrath et al. | |
| 6,382,197 B1 | 5/2002 | Matsumoto | |
| 6,711,894 B2 * | 3/2004 | Bruenemann et al. | 60/289 |
| 6,832,474 B2 | 12/2004 | Hirooka et al. | |
| 6,862,885 B1 | 3/2005 | Mitchell | |
| 6,883,323 B2 | 4/2005 | Hummel | |
| 6,912,845 B2 * | 7/2005 | Hirooka | 60/285 |
| 6,918,245 B2 | 7/2005 | Hirooka et al. | |
| 6,920,756 B2 | 7/2005 | Hoecker et al. | |
| 6,951,211 B2 | 10/2005 | Bryant | |
| 6,978,600 B2 | 12/2005 | Hirooka | |
| 7,155,899 B2 * | 1/2007 | Beer et al. | 60/284 |
| 7,448,202 B2 * | 11/2008 | Tsujimura et al. | 60/289 |
| 7,895,824 B2 * | 3/2011 | Tsujimura et al. | 60/289 |
| 8,014,931 B2 | 9/2011 | Araki et al. | |
| 2006/0037310 A1 | 2/2006 | Sakata et al. | |
| 2007/0130948 A1 * | 6/2007 | Boehm et al. | 60/612 |
| 2007/0245717 A1 * | 10/2007 | Kang et al. | 60/284 |
| 2008/0202223 A1 | 8/2008 | Tsujimura et al. | |
| 2010/0025129 A1 * | 2/2010 | Rauner et al. | 180/65.25 |
| 2013/0019593 A1 | 1/2013 | Jacques et al. | |

FOREIGN PATENT DOCUMENTS

| | | |
|---|---|---|
| DE | 10303776 A1 | 8/2004 |
| DE | 102004017608 A1 | 10/2005 |
| DE | 102008052088 A1 | 4/2010 |
| EP | 2261481 A1 | 12/2010 |
| JP | 57200618 A | 12/1982 |
| JP | 58046276 A | 3/1983 |
| JP | 58185921 A | 10/1983 |
| JP | 62020632 A | 1/1987 |
| JP | 62218620 A | 9/1987 |
| JP | 01-092532 A | 4/1989 |
| JP | 2004068631 A | 3/2004 |
| WO | 2009068181 A1 | 6/2009 |

OTHER PUBLICATIONS

John E. Dec, Wontae Hwang, Yi Yang, HCCI and Stratified-Charge CI Engine Combustion Research, U.S. Doe, Office of Vehicle Technologies Annual Merit Review and Peer Evaluation, Sandia National Laboratories, May 19, 2009, pp. 1-18.

SAE International; SAE Technical Paper Series; Mixed-Source EGR for Enabling High Efficiency Clean Combustion Modes in a Light-Duty Diesel Engine, Kukwon Cho, Manbae Han, Robert M. Wagner and C. Scott Sluder; Oak Ridge National Laboratory; Reprinted From: In-Cylinder Diesel Particulate & NOx Control, 2008 (SP-2168); 2008-01-0645; 2008 World Congress Detroit, Michigan Apr. 14-17, 2008, 11 pgs.

SAE International SAE Technical Paper Series; "Comparison of Different EGR Solutions"; Oldrich Vitek, Jan Macek and Milos Polasek, Czech Technical University in Prague, Josef Bozek Research Center, Stefan Schmerbeck, Volkswagen AG, Thomas Kammerdiener AVL Graz, AVL Fuel Systems; Reprinted from: Modeling of SI & Diesel Engines, 2008 (SP-2156); 2008-01-0206; 2008 World Congress Detroit, Michigan Apr. 14-17, 2008, 20 pgs.

Can Future Emissions Limits be Met with a Hybrid EGR System Alone. Robert Czarnowski, Volker Joergl, Olaf Weber, John Shutty, Phil Keller; BorgWarner, Inc., 2008 Diesel Engine-Efficiency and Emissions Research (DEER) conference; Aug. 4-7, 2008 Dearborn, Michigan, pp. 1-20.

Office Action regarding related CN Application No. 201210088313.8; Jan. 6, 2014; 7 pgs.

Office Action regarding related CN App. No. 201210250401.3; Feb. 25, 2014; 6 pgs.

* cited by examiner

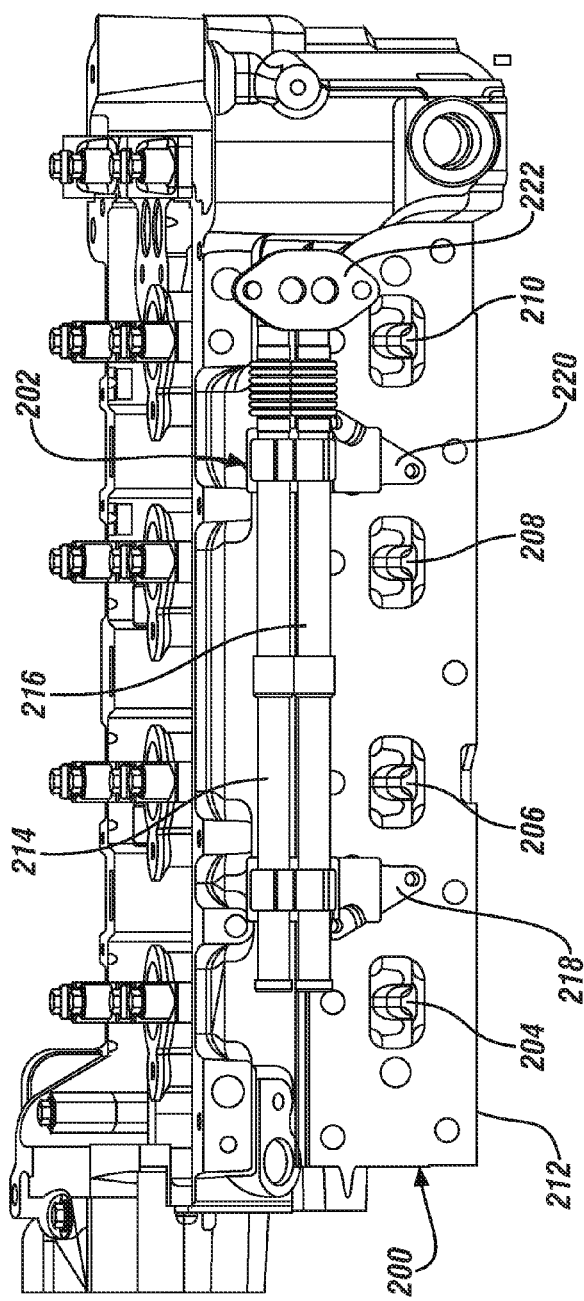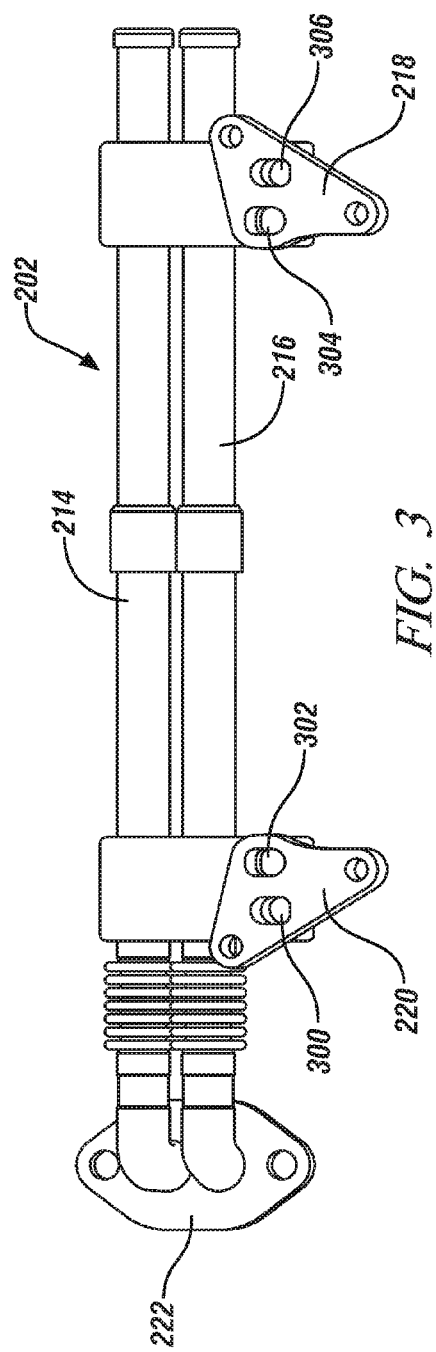
FIG. 2
FIG. 3

SECONDARY AIR INJECTION SYSTEM AND METHOD

FEDERAL RESEARCH STATEMENT

This invention was made with Government support under Agreement No. DE-FC26-07NT43271, awarded by the Department of Energy. The U.S. Government has certain rights in the invention.

FIELD OF THE INVENTION

The subject invention relates to internal combustion engines, and, more particularly, to secondary air injection systems for internal combustion engines.

BACKGROUND

An engine control module of an internal combustion engine controls the mixture of fuel and air supplied to combustion chambers of the engine. After the spark plug ignites the air/fuel mixture, combustion takes place and later the combustion gases exit the combustion chambers through exhaust valves. The combustion gases are directed by an exhaust manifold to a catalytic converter or other exhaust after treatment systems.

During certain engine operating periods, combustion gases that enter the exhaust manifold are not completely burned. The combustion gases will continue to burn in the exhaust manifold if a sufficient amount of oxygen is available. Secondary air injection systems are used to inject additional air into the exhaust flow to allow combustion to continue, which improves the performance of exhaust after treatment systems and reduces emissions.

In addition, enhanced performance and reduced emissions can be provided by using a turbocharger. Twin scroll technology is often used to enhance the performance of a turbocharged engine; in particular inline four or six cylinder engines as well as those having V architectures. In engines featuring twin scroll or twin turbo technology, the exhaust manifold of the engine is designed to group the cylinders so the events of the cylinders in the same group are separated to minimize cylinder-to-cylinder exhaust flow interference. For example, cylinder groups may be formed to provide sequences of high pulse energy to drive the turbine wheel, as each group experiences combustion, thereby maintaining a strength or magnitude of exhaust pulses. Thus, a group of cylinders out of phase with a second firing group of cylinders does not interfere or degrade an exhaust pulse caused by igniting the firing cylinders. Accordingly, twin scroll turbocharger systems have increased forces imparted on the turbine wheel to improve turbine performance. However, secondary air injection systems may allow cross talk or degradation between cylinder groups by allowing communication between the exhaust flow of cylinder groups, thereby reducing energy provided by exhaust pressure pulses that may be used to drive a turbine wheel.

SUMMARY OF THE INVENTION

In one exemplary embodiment, a secondary air injection system includes a first conduit in fluid communication with at least one first exhaust passage of the internal combustion engine and a second conduit in fluid communication with at least one second exhaust passage of the internal combustion engine, wherein the at least one first and second exhaust passages are in fluid communication with a turbocharger. The system also includes an air supply in fluid communication with the first and second conduits and a flow control device that controls fluid communication between the air supply and the first conduit and the second conduit and thereby controls fluid communication to the first and second exhaust passages of the internal combustion engine.

In another exemplary embodiment, a method for secondary air injection to exhaust ports of an internal combustion engine includes directing combustion gases from the internal combustion engine to a first exhaust passage and a second exhaust passage of the internal combustion engine, injecting air from a first conduit into the first exhaust passage, forming a first exhaust mixture, and injecting air from a second conduit into the second exhaust passage, forming a second exhaust mixture. The method also includes delivering the first exhaust mixture from the first conduit to a turbocharger and delivering the second exhaust mixture from the second conduit to the turbocharger, wherein the first exhaust mixture from the first conduit is separated from the first exhaust mixture from the second conduit.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which:

FIG. 2 is a side view of an embodiment of a cylinder head and secondary air injection system;

FIG. 3 is a detailed side view of the secondary air injection system of FIG. 2.

DESCRIPTION OF THE EMBODIMENTS

Figure 1:
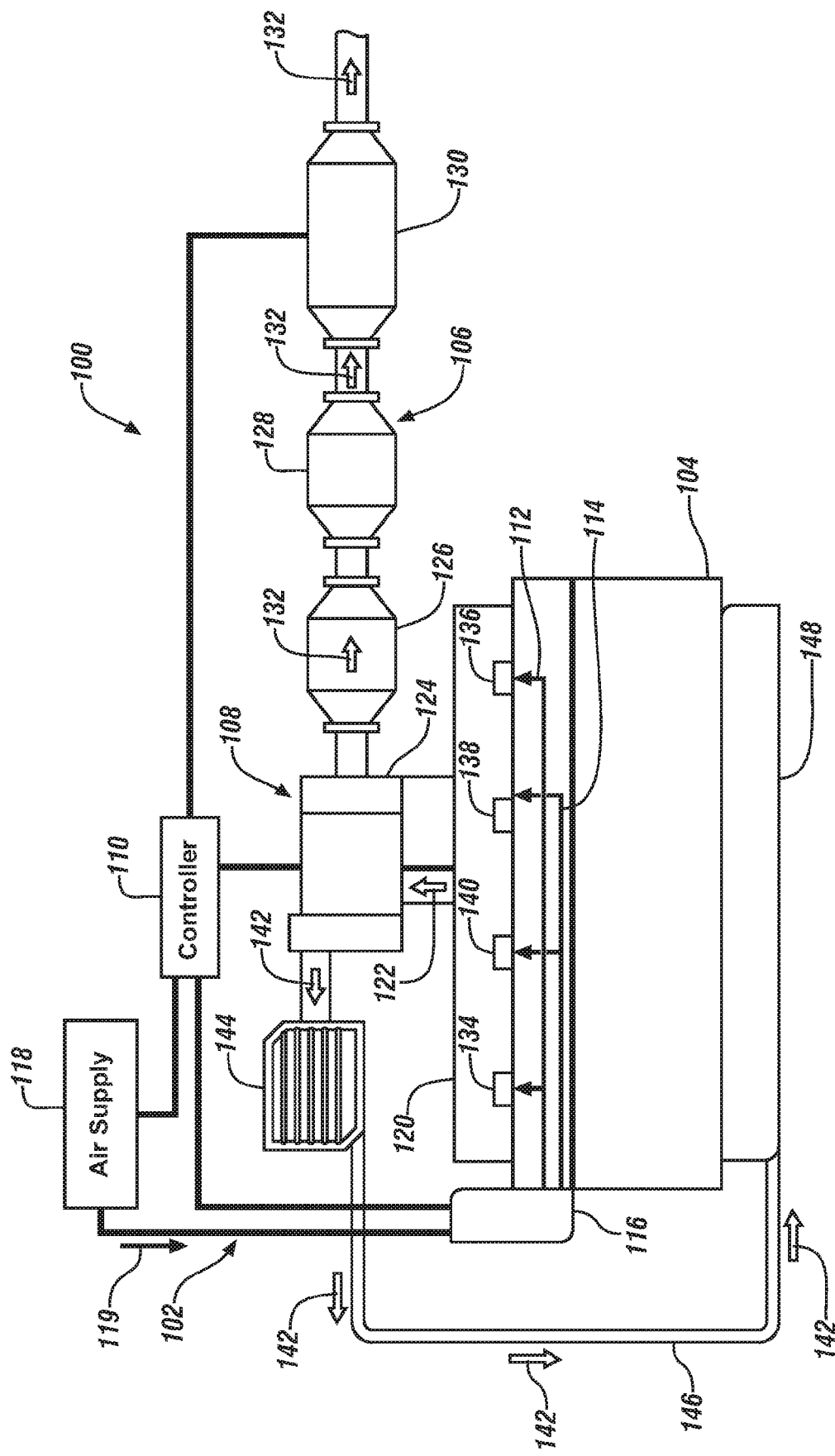
FIG. 1 is a schematic diagram of an embodiment of an internal combustion engine.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 illustrates an exemplary internal combustion engine 100, in this case an in-line four cylinder engine, including a secondary air injection system 102, an engine block and cylinder head assembly 104, an exhaust system 106, a turbocharger 108 and a controller 110. The secondary air injection system 102 includes a first conduit 112, a second conduit 114, a flow control device 116 and an air supply 118. Coupled to the engine block and cylinder head assembly 104 is an exhaust manifold 120, which may be integrated with, or external to, the engine block and cylinder head assembly 104. In addition, the engine block and cylinder head assembly 104 includes cylinders (not shown) wherein the cylinders receive a combination of combustion air and fuel. The combustion air/fuel mixture is combusted resulting in reciprocation of pistons (not shown) located in the cylinders. The reciprocation of the pistons rotates a crankshaft (not shown) to deliver motive power to a vehicle powertrain (not shown) or to a generator or other stationary recipient of such power (not shown) in the case of a stationary application of the internal combustion engine 100. The combustion of the air/fuel mixture causes a flow of exhaust gas through the exhaust manifold 120 and turbocharger 108 and into the exhaust system 106. The exhaust gas flow 122 from the exhaust manifold 120 may include secondary air mixed with combustion exhaust to improve efficiency of the exhaust system 106.

The exhaust system 106 may include close coupled catalysts 126 and 128 as well as an under floor catalyst 130. The exhaust gas 132 flows through the exhaust system 106, for the removal or reduction of pollutants, and is then released into the atmosphere. During startup of an exemplary internal combustion engine 100, some combustion gases that enter the exhaust manifold 120 are not completely burned. The secondary air injection system 102 injects air into the exhaust gas flow 122 causing the unburned combustion gases to burn in the exhaust manifold 120, thereby reducing emissions. Specifically, the first conduit 112 injects air into first exhaust passages 134 and 136 of the exhaust manifold 120 while the second conduit 114 injects air into second exhaust passages 138 and 140. The flow control device 116 selectively provides air 119 from air supply 118 to the first and second conduits 112, 114 for delivery to the first and second exhaust passages of the exhaust manifold. In the depicted embodiment, the first conduit 112 and second conduit 114 are not in fluid communication with each other. An exemplary air supply 118 may include one or more air pumps or suitable devices configured to direct pressurized air to the flow control device 116. An exemplary flow control device 116 includes any suitable device for controlling fluid flow, such as one or more valves, multi-valves or linear valves. As the first conduit 112 and second conduit 114 direct air into the exhaust passages 134, 136, 138 and 140, the air mixes with combustion exhaust, thereby forming the exhaust gas flow 122, and improving the burning of combustible constituents of the combustion gases in the exhaust system 106. In an exemplary internal combustion engine 100, the secondary air injection system 102 is configured to inject air into the exhaust passages 134, 136, 138 and 140 during a selected time period following engine startup, referred to as the start up period, until the quantity of unburned combustion gases exiting the engine is reduced. Accordingly, in an embodiment, the flow control device 116 is in an open position to deliver secondary air to the combustion gas in the exhaust passages during the start up period, and is in a closed position, after the internal combustion engine 100 is warmed up. The controller 110 is in signal communication with the turbocharger 108, the air supply 118, the flow control device 116 and the exhaust system 106, wherein the controller 110 is configured to use various signal inputs to control the flow of air through the secondary air injection system 102 and to the combustion gas in the exhaust passages. As used herein the term controller refers to an application specific integrated circuit (ASIC), an electronic circuit, a processor (shared, dedicated or group) and memory that executes one or more software or firmware programs, a combinational logic circuit, and/or other suitable components that provide the described functionality.

Still referring to FIG. 1, the exhaust gas flow 122 drives a turbine wheel (not shown) of turbocharger 108, thereby providing energy to create a compressed air charge 142. In an exemplary embodiment, the compressed air charge 142 is cooled by a charge cooler 144 and is routed through the conduit 146 to an intake manifold 148. The compressed air charge 142 provides additional combustion air (when compared to a non-turbocharged, normally aspirated engine) for combustion with fuel in the cylinders (not shown), thereby improving the power output and efficiency of the internal combustion engine 100. In addition, exemplary embodiments of turbocharger 108 may utilize twin scroll or twin turbo technology. The exemplary turbocharger 108 includes a twin scroll turbine housing dual, side by side passages to direct exhaust gas into the housing. Twin scroll technology separates exhaust pulses from the cylinders by as many degrees as possible as it relates to a firing order of the cylinders. The twin scroll turbocharger reduces lag, decreases exhaust manifold backpressure on the top end of the combustion cycle and increases fuel economy. The twin scroll turbocharger design keeps combustion exhaust gases 122 from an out of phase or opposite position cylinder from reducing the energy of an exhaust pulse from a recently fired cylinder. Therefore, the first and second conduits 112, 114 of the secondary air injection system 102 maintain the separation of combustion gases from out of phase cylinders by separately delivering secondary air to exhaust passages of the exhaust manifold according to the firing order of the engine cylinders. For example, for an inline four cylinder internal combustion engine 100 with a firing order of 1-3-4-2, combustion gas flow in the exhaust passages 134 and 136 (i.e. cylinders 1 and 4) are in phase and combustion gas flow in the exhaust passages 138 and 140 (i.e. cylinders 3 and 2) are in phase. In addition, combustion gas flow in the exhaust passages 134 and 136 is described as out of phase with the combustion gas flow in exhaust passages 138 and 140. Accordingly, the first conduit 112 delivers secondary air to the exhaust passages 134 and 136 and the second conduit 114 delivers secondary air to the exhaust 138 and 140 reduce or eliminate cylinder-to-cylinder exhaust flow interference (or "cross talk") and maintain exhaust pulse energy for the turbocharger 108. Further, the configuration of the secondary air injection system 102 with first and second conduits 112, 114 to maintain exhaust pulse energy additionally benefits exemplary turbochargers 108 that employ twin turbo technology. In one exemplary embodiment, in-phase describes cylinders with substantially similar positions in the combustion cycle at a point in time, such that the first and second firing cylinders are out of phase with reference to the third and fourth firing cylinders. Thus, an "average" position (the average position in the cycle) of the first and second firing cylinders is about 180 degrees out of phase, with respect to an "average" position of the third and fourth firing cylinders.

FIG. 2 is a side view of an exemplary cylinder head 200 with a secondary air injection system 202. The secondary air injection system 202 provides air to be mixed with combustion exhaust gas flow 122 in exhaust passages 204, 206, 208 and 210, wherein each passage corresponds to a cylinder in the internal combustion engine 100 (FIG. 1). The exhaust manifold 120 (FIG. 1) is coupled to a surface 212 of the cylinder head 200 to direct the combustion exhaust gas flow 122 to the exhaust system 106 (FIG. 1). A first conduit 214 and a second conduit 216 are configured to inject or deliver air into the exhaust passages 204, 206, 208 and 210 to improve burning of combustible gases in the combustion gas 122 during the engine start up period. The first and second conduits 214, 216 are each attached to the cylinder head 200 by bracket members 218 and 220. The exemplary secondary air injection system 202 may be described as an external secondary air injection system 202, wherein the first and second conduits 214, 216 are located outside of the cylinder head 200 as illustrated.

FIG. 3 is a detailed side view of the exemplary secondary air injection system 202 shown in FIG. 2, which includes the first conduit 214 and second conduit 216 as well as the bracket members 218 and 220. The bracket member 218 includes a passage 304 and a passage 306. Similarly, the bracket member 220 includes a passage 300 and a passage 302. In one embodiment, the passages 300 and 306 are in fluid communication with the first conduit 214 and are configured to provide secondary air to the exhaust passages 204 and 210. In addition, the passages 302 and 304 are in fluid communication with the second conduit 216 and are configured to provide secondary air to the exhaust passages 206 and 208. Thus, the first conduit 214 and second conduit 216 are each configured to provide secondary air to exhaust passages receiving combustion gas from in-phase cylinders to avoid cross talk between out of phase cylinders, thereby maintaining the energy of exhaust pulses. In other embodiments, each exhaust passages (204, 206, 208, 210) may each have a dedicated secondary air conduit and a dedicated flow control device, thereby enabling precise control of air flow to each cylinder. In yet another embodiment, the first conduit 214 and second conduit 216 may each have their own flow control devices (FIG. 1, 116) configured to control fluid communication with the air supply (FIG. 1, 118). Moreover, for V-configuration engines, the first conduit 214 and second conduit 216 may each be in fluid communication with a separate bank of cylinders, thereby reducing exhaust cross talk. Another exemplary internal combustion engine 100 (FIG. 1) includes a V-configuration with a pair of twin scroll turbochargers, wherein each conduit (214, 216 and possibly more) may be in fluid communication with one or more cylinder from each bank of the internal combustion engine 100. Thus, the grouping of exhaust gas flows provides higher energy gas pulses to the turbocharger. In an embodiment, the separated higher energy pulses improve the overall performance of a twin scroll turbocharger.

Figure 4:
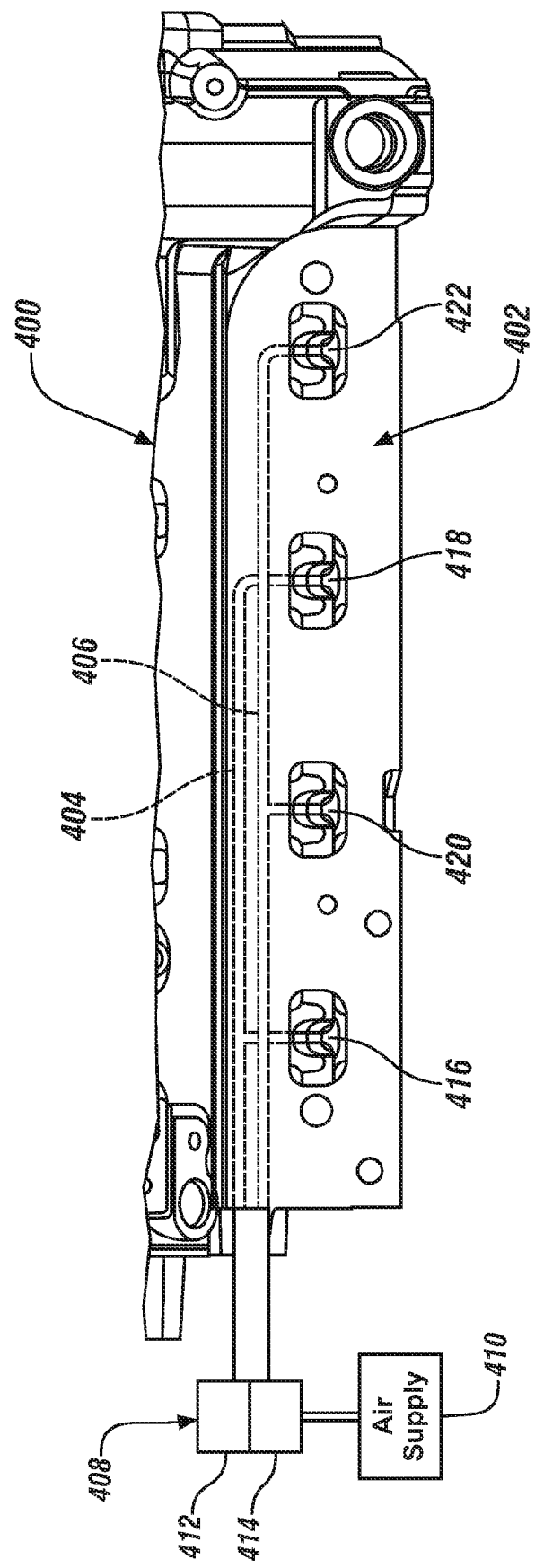
FIG. 4 is a side view of another embodiment of a cylinder head and secondary air injection system.

FIG. 4 is a detailed side view of an exemplary cylinder head 400 and a secondary air injection system 402. The secondary air injection system 402 includes a first conduit 404, a second conduit 406, a flow control device 408 and an air supply 410. The exemplary secondary air system 402 is an integrated system where the first conduit 404 and second conduit 406 comprise passages formed inside the cylinder head 400 by any suitable means, such as milling, machining or casting. The exemplary flow control device 408 may include a first flow control device 412 and a second flow control device 414. The first flow control device 412 and second flow control device 414 are configured to control the flow of secondary air from the air supply 410 to the first conduit 404 and second conduit 406, respectively. Exemplary first and second flow control devices 412, 414 include valves or other devices configured to regulate fluid flow by opening, closing, or partially allowing flow therethrough. As depicted, the flow control device 408 is configured to control secondary air flow through the first conduit 404 and second conduit 406 and into exhaust passages 416, 418, 420 and 422. The first conduit 404 is in fluid communication with the exhaust passages 416 and 418, while the second conduit is in fluid communication with the exhaust passages 420 and 422. By selectively delivering secondary air to in-phase exhaust ports the exhaust ports with separate conduits, cross talk between out of phase exhaust ports is reduced while exhaust pulse integrity or energy is maintained. In addition, the secondary air injection system 402 provides secondary air to burn combustible gases during the engine start up period, thereby reducing emissions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A method for secondary air injection to exhaust passages of an internal combustion engine comprising:
   directing combustion gases from the internal combustion engine to a first exhaust passage of an exhaust manifold of the internal combustion engine and a second exhaust passage of the exhaust manifold;
   injecting air from a first conduit into the first exhaust passage in fluid communication with a first set of cylinders, forming a first exhaust mixture;
   injecting air from a second conduit into the second exhaust passage in fluid communication with a second set of cylinders, forming a second exhaust mixture;
   controlling injecting air from the first conduit into the first exhaust passage and the second conduit to the second exhaust passage to inject air to at least one of the first and second conduits during an engine startup period and to stop air injection after an engine warm up period, wherein the first conduit and second conduit are attached to and in fluid communication with a cylinder head of the internal combustion engine, the first conduit and second conduit being located outside of the cylinder head and not in fluid communication with each other;
   delivering the first exhaust mixture from the first conduit to a the turbocharger; and
   delivering the second exhaust mixture from the second conduit to the turbocharger, wherein the first exhaust mixture from the first conduit is separated from the second exhaust mixture from the second conduit and the exhaust-gas flow in the first exhaust passage is out of phase with the exhaust-gas flow in the second exhaust passage.

2. The method of claim 1, comprising providing air from an air supply via a flow control device to the first conduit and the second conduit.

3. A secondary air injection system for an internal combustion engine, the secondary air system comprising:
   a first conduit in fluid communication with at least one first exhaust passage of an exhaust manifold and with a first set of cylinders of the internal combustion engine;
   a second conduit in fluid communication with at least one second exhaust passage of the exhaust manifold and with a second set of cylinders of the internal combustion engine, wherein the at least one first and second exhaust passages are in fluid communication with a turbocharger and the first conduit and second conduit are attached to and in fluid communication with a cylinder head of the internal combustion engine, the first conduit and second conduit being located outside of the cylinder head and not in fluid communication with each other;
   an air supply in fluid communication with the first and second conduits;
   a flow control device; and
   a controller coupled to the flow control device configured to control fluid communication between the air supply and the first conduit and the second conduit and configured to open fluid communication with at least one of the first and second conduits between the air supply and flow control device during an engine startup period and close fluid communication after an engine warm up period, wherein air from the first and second conduits mixes with exhaust gas that flows into the turbocharger and the exhaust-gas flow in the first exhaust passage is out of phase with the exhaust-gas flow in the second exhaust passage.

4. The system of claim 3, wherein the flow control device comprises a first flow control device and second flow control device, wherein the first and second flow control devices are configured to individually control fluid communication between the air supply and the first and second conduits, respectively.

5. The system of claim 3, wherein the flow control device comprises a valve, multi-valves or a linear valve.

6. The system of claim 3, wherein the first conduit and second conduit are isolated with respect to each other to maintain an energy of exhaust pulses provided to the turbocharger.

7. The system of claim 3, wherein the flow control device is configured to adjust a flow rate in a plurality of positions between an open position and a closed position.

8. The system of claim 3, wherein the flow control device provides flow from the air supply to both first and second conduits in an open position and no flow from the air supply in a closed position.

9. An internal combustion engine comprising:
a turbocharger;
a cylinder head;
a first conduit in fluid communication with at least one first exhaust passage of an exhaust manifold of the internal combustion engine and with a first set of cylinders in the cylinder head;
a second conduit in fluid communication with at least one second exhaust passage of the exhaust manifold and with a second set of cylinders in the cylinder head, wherein the at least one first and second exhaust passage are in fluid communication with the turbocharger and the first conduit and second conduit are attached to and in fluid communication with a cylinder head of the internal combustion engine, the first conduit and second conduit being located outside of the cylinder head and not in fluid communication with each other;
a flow control device configured to control an air flow to the first and second conduits and to the first and second exhaust passages; and
a controller coupled to the flow control device configured to open fluid communication for the air flow to at least one of the first and second conduits during an engine startup period and close fluid communication after an engine warm up period, wherein air from the first and second conduits mixes with exhaust gas that flows into the turbocharger and the exhaust-gas flow in the first exhaust passage is out of phase with the exhaust-gas flow in the second exhaust passage.

10. The internal combustion engine of claim 9, wherein the flow control device comprises a first flow control device and second flow control device, wherein the first and second flow control devices are configured to control fluid communication between the air supply and the first and second conduits, respectively.

* * * * *